(12) United States Patent
Richards et al.

(10) Patent No.: US 9,855,933 B2
(45) Date of Patent: Jan. 2, 2018

(54) VEHICLE SPEED CONTROL SYSTEM

(71) Applicant: Jaguar Land Rover Limited, Whitley Coventry Warwickshire (GB)

(72) Inventors: Karl Richards, Leamington Spa (GB); Simon Owen, Redditch (GB)

(73) Assignee: Jaguar Land Rover Limited, Whitley, Coventry, Warwickshire (GB)

(*) Notice: Subject to any disclaimer, the term of this patent is extended or adjusted under 35 U.S.C. 154(b) by 0 days.

(21) Appl. No.: 14/891,631

(22) PCT Filed: Apr. 15, 2014

(86) PCT No.: PCT/EP2014/057602
§ 371 (c)(1),
(2) Date: Nov. 16, 2015

(87) PCT Pub. No.: WO2014/183946
PCT Pub. Date: Nov. 20, 2014

(65) Prior Publication Data
US 2016/0121862 A1    May 5, 2016

(30) Foreign Application Priority Data
May 16, 2013   (GB) .................................. 1308806.7

(51) Int. Cl.
*B60T 7/12*    (2006.01)
*B60G 17/015*  (2006.01)
*B60W 30/14*   (2006.01)

(52) U.S. Cl.
CPC .............. *B60T 7/12* (2013.01); *B60G 17/015* (2013.01); *B60W 30/143* (2013.01); *B60W 2520/16* (2013.01); *B60W 2710/0666* (2013.01)

(58) Field of Classification Search
None
See application file for complete search history.

(56) References Cited

U.S. PATENT DOCUMENTS

| 7,349,776 B2 | 3/2008 | Spillane et al. |
| 8,046,130 B2 | 10/2011 | Takahara et al. |
| 8,457,832 B2 | 6/2013 | Ono et al. |
| 8,489,300 B2 | 7/2013 | Kataoka et al. |

(Continued)

FOREIGN PATENT DOCUMENTS

| CN | 101595017 A | 12/2009 |
| DE | 10353692 A1 | 6/2004 |

(Continued)

OTHER PUBLICATIONS

International Search Report for application No. PCT/EP2014/057602 dated Aug. 6, 2014, 6 pages.

(Continued)

*Primary Examiner* — Jonathan M Dager
*Assistant Examiner* — Garrett Evans
(74) *Attorney, Agent, or Firm* — Reising Ethington P.C.

(57) ABSTRACT

A vehicle control system for a vehicle having a plurality of wheels, the vehicle speed control system being operable to receive an input signal corresponding to a rate of change of an angle of pitch of the vehicle, pitch rate, the system being operable to command a change in an amount of torque applied to at least one of the plurality of wheels in dependence on the pitch rate.

17 Claims, 6 Drawing Sheets

(56) References Cited

U.S. PATENT DOCUMENTS

| | | |
|---|---|---|
| 8,880,292 B2 | 11/2014 | Shiozawa et al. |
| 2009/0138169 A1 | 5/2009 | Uematsu |
| 2010/0168975 A1* | 7/2010 | Takahara .............. B60T 8/1755 701/70 |
| 2012/0083981 A1 | 4/2012 | Hihei |
| 2014/0350789 A1 | 11/2014 | Anker et al. |
| 2015/0232092 A1 | 8/2015 | Fairgrieve et al. |

FOREIGN PATENT DOCUMENTS

| | | |
|---|---|---|
| DE | 102007042128 A1 | 3/2009 |
| GB | 2492655 A | 1/2013 |
| GB | 2492748 A | 1/2013 |
| JP | 2007118898 A | 5/2007 |
| JP | 2009108830 A | 5/2009 |
| JP | 2009127456 A | 6/2009 |
| JP | 20100259294 A | 11/2010 |
| JP | 2012046037 A | 3/2012 |
| JP | 2012047553 A | 3/2012 |
| JP | 2012076472 A | 4/2012 |
| JP | 2012254732 A | 12/2012 |
| WO | 2006042302 A1 | 4/2006 |
| WO | WO2007026496 A1 | 3/2007 |
| WO | 2008017526 A1 | 2/2008 |
| WO | 2009035121 A2 | 3/2009 |
| WO | 2012026441 A1 | 3/2012 |
| WO | 2014027071 A1 | 2/2014 |

OTHER PUBLICATIONS

Combined Search and Examination Report for corresponding application No. GB 1308806.7, dated Nov. 7, 2013, 2 pages.
Written Opinion for application No. PCT/EP2014/057602 dated Aug. 6, 2014, 10 pages.
Japanese Office Action with English summary for JP application No. 2016-513263, dated Oct. 4, 2016, 6 pages.
Chinese Office Action in Chinese with English translation for CN application No. 201480028452.9, dated May 3, 2017, 17 pages.

* cited by examiner

VEHICLE SPEED CONTROL SYSTEM

FIELD OF THE INVENTION

The invention relates to a system for controlling the speed of a vehicle, in particular, but not exclusively, the invention relates to a system for controlling the speed of a land-based vehicle which is capable of driving in a variety of different and extreme terrains and conditions. Aspects of the invention relate to a system, to a method and to a vehicle.

BACKGROUND TO THE INVENTION

When driving a vehicle on rough roads or in off-road conditions, terrain features presenting a relatively abrupt change in gradient of the driving surface may be encountered. For example, steep downward gradients may be encountered abruptly as a vehicle negotiates terrain features such as pot-holes, craters, trenches, steps or the like. When such a terrain feature is encountered, the vehicle may experience relatively abrupt acceleration as one or both leading wheels begin to descend the gradient. The increase in acceleration may be followed by an abrupt deceleration when the vehicle completes travel over the downward gradient. In the case of a pot-hole, trench or the like the vehicle may then abruptly encounter a relatively steep upward gradient which it may be necessary to negotiate in order to exit the terrain feature. Encountering such terrain features can adversely affect composure of the vehicle and bring discomfort to an occupant.

It is known to provide a vehicle speed control system, such systems typically being referred to as cruise control systems. In such systems vehicle speed is maintained once set by the user without further intervention by the user so as to improve the driving experience for the user.

The user selects a speed at which the vehicle is to be maintained, and the vehicle is maintained at that speed for as long as the user does not apply a brake or, in some systems, the clutch. The cruise control system takes its speed signal from the driveshaft or wheel speed sensors. When the brake or the clutch is depressed, the cruise control system is disabled so that the user can change the vehicle speed without resistance from the system. If the user depresses the accelerator pedal the vehicle speed will increase, but once the user removes his foot from the accelerator pedal the vehicle reverts to the pre-set cruise speed.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly.

Such systems are usually operable only above a certain speed, typically around 15 mph, and are ideal in circumstances in which the vehicle is travelling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when parking. Such systems are therefore ineffective in certain driving conditions (e.g. low speed) and are set to be automatically disabled in circumstances in which a user may not consider it to be desirable to do so.

It is also known to provide a control system for a motor vehicle for controlling one or more vehicle subsystems. U.S. Pat. No. 7,349,778, the content of which is hereby incorporated by reference, discloses a vehicle control system comprising a plurality of subsystem controllers including an engine management system, a transmission controller, a steering controller, a brakes controller and a suspension controller. The subsystem controllers are each operable in a plurality of subsystem function modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the sub-systems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response® (TR) System or controller.

Statements of Invention

Embodiments of the invention may be understood with reference to the appended claims.

Aspects of the present invention provide a system, a vehicle and a method.

In an aspect of the invention for which protection is sought there is provided a vehicle control system for a vehicle having a plurality of wheels, the vehicle speed control system being operable to receive an input signal corresponding to a rate of change of an angle of pitch of the vehicle, pitch rate, the system being operable to command a change in an amount of torque applied to at least one of the plurality of wheels in dependence on the pitch rate.

Embodiments of the present invention have the advantage that a vehicle may be controlled in such a manner as to increase vehicle composure and occupant comfort.

Embodiments of the invention have the advantage that if the system determines that the pitch rate exceeds a prescribed value indicating for example that the vehicle has begun abruptly to descend a steep gradient, the system can reduce the amount of torque applied to one or more wheels. This may have the effect of reducing a rate at which the vehicle will otherwise descend the gradient. This may enhance occupant comfort and vehicle composure, and may reduce or prevent damage to a vehicle in some situations. For example, it a vehicle begins to traverse a pothole, pit, trench or other relatively abrupt depression in a driving surface the control system may be configured to apply a braking system to slow the vehicle to reduce the rate at which the vehicle enters the depression.

The signal in respect of pitch rate may be a signal generated in addition to one or more signals in respect of vehicle longitudinal acceleration, wheel speed and/or driving surface gradient. Embodiments of the invention may be configured for operation whilst a vehicle is driving in a forward or reverse direction.

The system may be operable to command the change in the amount of torque when a leading edge of the vehicle pitches in a downward direction.

That is, if a leading end of the vehicle pitches in a downward direction, the control system is operable to command the change in the amount of torque in dependence on the pitch rate.

The control system may be operable to command the change in an amount of torque applied to at least one of the plurality of wheels when a leading edge of the vehicle pitches in a downward direction at a pitch rate exceeding a prescribed rate.

The control system may be operable to command the change in the amount of torque applied to at least one of the plurality of wheels when the leading edge of the vehicle pitches in a downward direction at a pitch rate exceeding a prescribed rate for a period exceeding a prescribed period.

The control system may be operable to command the change in the amount of torque applied to at least one of the plurality of wheels when the leading edge of the vehicle pitches in a downward direction at a pitch rate exceeding a prescribed rate for a distance exceeding a prescribed distance.

The control system may be operable to command the change in the amount of torque so as to oppose acceleration of the vehicle.

By change in the amount of torque to oppose acceleration is meant that the amount of torque applied to propel the vehicle in the direction of intended motion is reduced, and may be reversed such that torque opposing the direction of travel of the vehicle is applied.

Thus in the event a powertrain of the vehicle is applying a positive torque to one or more wheels to drive the vehicle, the amount of positive torque may be reduced to a less positive value, substantially to zero, or to a negative value. Negative torque may be applied by a powertrain, for example, by means of engine compression braking or an electric machine, for example when operated as an electrical generator. One or more electric machines may be employed in a regenerative braking system for example.

It is to be understood that embodiments of the present invention are useful in hybrid electric vehicles and electric vehicles as well as vehicles powered by an engine such as an internal combustion engine.

In addition or instead, negative torque may be applied by means of a foundation braking system such as a friction braking system. Application of negative torque by means of a foundation braking system has the advantage that, typically, negative torque may be applied to a wheel more quickly following a command by the control system compared with negative torque by means of a powertrain, for example by means of engine compression braking, due at least in part to inertia of one or more components of the powertrain such as an engine.

In the event a powertrain is already applying negative torque when the system commands the change, the amount of negative torque applied by the powertrain may be made more negative.

Alternatively or in addition to a change in powertrain torque, a braking system may be commanded to apply a negative torque to one or more wheels.

For example, if a vehicle is descending an incline and the speed control system has applied a braking system to slow the vehicle, an amount of brake torque applied by the braking system may be increased in dependence on a pitch rate of the vehicle. Thus, if the vehicle encounters a sharp downward gradient due for example to the presence of a pot-hole, rut or the like as it descends the slope, abrupt acceleration of the vehicle may be substantially prevented or reduced by the increase in negative torque.

The prescribed rate may be determined at least in part in dependence on a type of terrain over which the vehicle is travelling.

The control system may be operable to determine the type of terrain over which the vehicle is travelling at least in part in dependence on one or more inputs indicative of terrain type.

The control system may be operable to determine the type of terrain over which the vehicle is travelling in dependence at least in part on an input from a user in respect of terrain type.

Thus, in some embodiments an input may be received from a user for example by means of a control dial or button, specifying the terrain type. Alternatively, the type of terrain may be determined automatically by the control system, for example in response to data in respect of surface coefficient of friction, surface roughness and/or one or more other parameters. This data may be received from one or more sensors associated with the system. Alternatively the data may be received from one or more other vehicle systems, for example via a controller area network (CAN) bus or the like. Other arrangements are also useful.

Thus, the control system may be operable to command a change in torque in response to pitch rate exceeding a prescribed value, where the prescribed value is set in dependence on the terrain type.

The prescribed period may be determined in dependence on the one or more inputs indicative of terrain type.

The prescribed distance may be determined in dependence on the one or more inputs indicative of terrain type.

The control system may be operable to control the vehicle to operate in one of a plurality of respective driving modes in each of which one or more vehicle subsystems are configured for operation on a different respective terrain type, wherein the driving mode is selected in dependence on the terrain type.

Thus, a 'grass/gravel/snow' driving mode may be selected for vehicle operation on terrain determined to be of the grass, gravel or snow type. A 'sand' driving mode may be selected for vehicle operation on terrain determined to be sand.

It is to be understood that the driving mode and the prescribed rate of change of pitch may both be determined in dependence on terrain type. As noted above, in some embodiments terrain type may be set by a user. In some embodiments, in addition or instead the system may be operable wherein terrain type may be detected automatically by the vehicle and the driving mode and prescribed rate of change of pitch determined accordingly.

The control system may be operable to command a change in one or more parameters associated with a vehicle suspension system in dependence at least in part on the pitch rate.

The control system may be operable to command the change in one or more parameters associated with the suspension system in dependence at least in part on the pitch rate and the terrain type.

The one or more parameters include a stiffness of the suspension system.

The system may be operable automatically to cause the vehicle to operate in accordance with a target speed value. Thus, the control system may be operable to implement speed control. Thus, in some embodiments, if whilst the vehicle speed is being controlled by the control system the rate of change of vehicle pitch exceeds a prescribed value, the system may command a change in torque in dependence on the pitch rate.

The target speed value may be referred to as a set-speed value.

The control system may be operable to cause the vehicle to travel at a speed substantially equal to the target speed value. In some embodiments the system may set a ceiling on the maximum allowable value of vehicle speed in dependence on one or more parameters such as terrain type, detected surface roughness, or any other suitable parameter. Thus the control system may cause the vehicle to travel at the target speed value unless a ceiling value of vehicle speed is lower than the target speed value in which case the vehicle is caused to travel at the ceiling value of vehicle speed.

The control system may be operable to cause the vehicle to operate in accordance with the target speed value by controlling an amount of torque applied to one or more wheels of the vehicle.

The control system may be operable to continue to cause the vehicle to operate in accordance with the target speed value in the presence of detected slip of one or more wheels.

Thus the control system does not cease (cancel) control of vehicle speed in the event that slip of one or more wheels is detected. Rather, the system may be configured to actively manage slip of the one or more wheels. This is in contrast to known cruise control systems which automatically cancel vehicle speed control when slip of one or more wheels is detected. For example is slip is detected by an electronic stability control system (ESC), dynamic stability control system (DSC) or traction control system (TCS) vehicle speed control by the cruise control system is cancelled.

In a further aspect of the invention for which protection is sought there is provided a vehicle comprising a control system according to a preceding aspect.

In a still further aspect of the invention for which protection is sought there is provided a method of controlling a vehicle by means of a control system comprising: receiving an input signal corresponding to a rate of change of an angle of pitch of the vehicle, pitch rate; and commanding a change in an amount of torque applied to at least one of a plurality of wheels of the vehicle in dependence on the pitch rate.

Within the scope of this application it is expressly intended that the various aspects, embodiments, examples and alternatives set out in the preceding paragraphs, in the claims and or in the following description and drawings, and in particular the individual features thereof, may be taken independently or in any combination. For example features described in connection with one embodiment are applicable to all embodiments, except where such features are incompatible.

BRIEF DESCRIPTION OF THE DRAWINGS

One or more embodiments of the invention will now be described, by way of example only, with reference to the accompanying figures in which:

FIG. 8 shows a plot of pitch rate as a function of time and a corresponding plot of commanded brake torque in response to change in pitch rate.

DETAILED DESCRIPTION

References herein to a block such as a function block are to be understood to include reference to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

Figure 1:
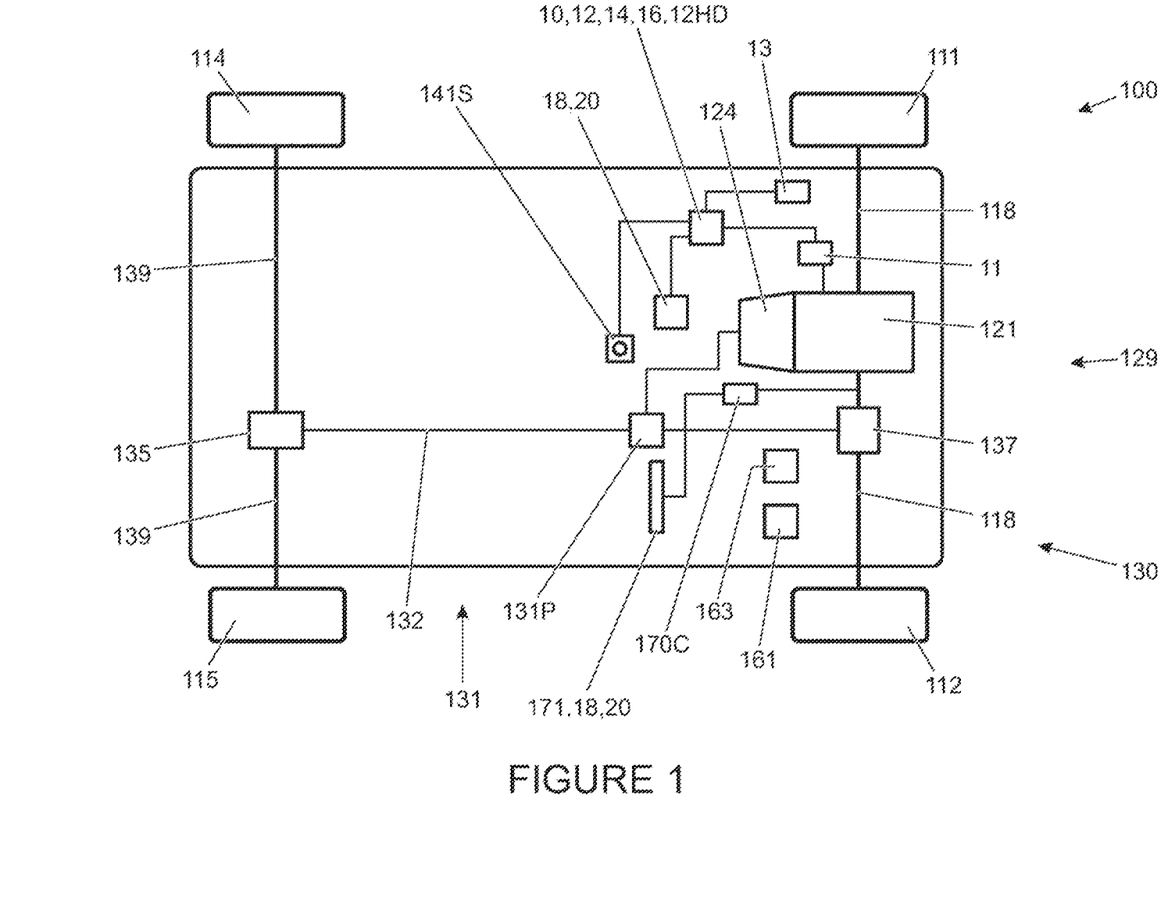
FIG. 1 is a schematic illustration of a vehicle according to an embodiment of the invention in plan view.
Figure 2:
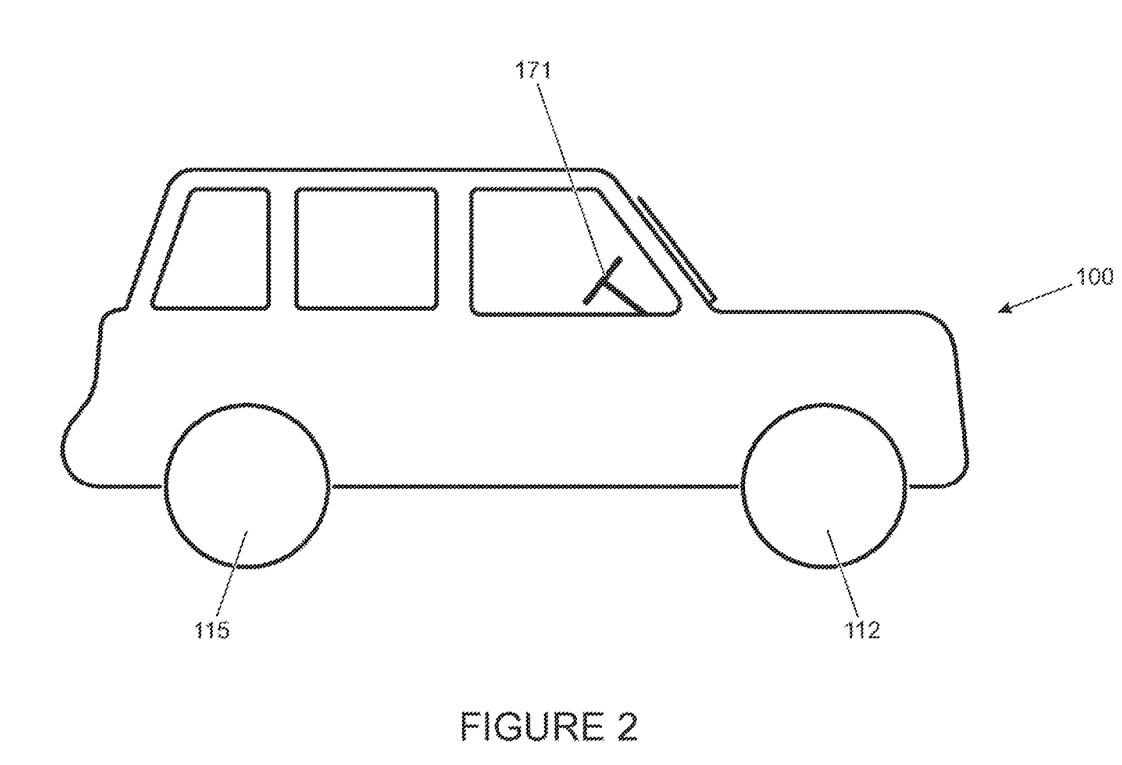
FIG. 2 shows the vehicle of FIG. 1 in side view.

FIG. 1 shows a vehicle 100 according to an embodiment of the present invention. The vehicle 100 has a powertrain 120 that includes an engine 121 that is connected to a driveline 130 having an automatic transmission 124. It is to be understood that embodiments of the present invention are also suitable for use in vehicles with manual transmissions, continuously variable transmissions or any other suitable transmission.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing selectable two wheel drive or four wheel drive operation. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
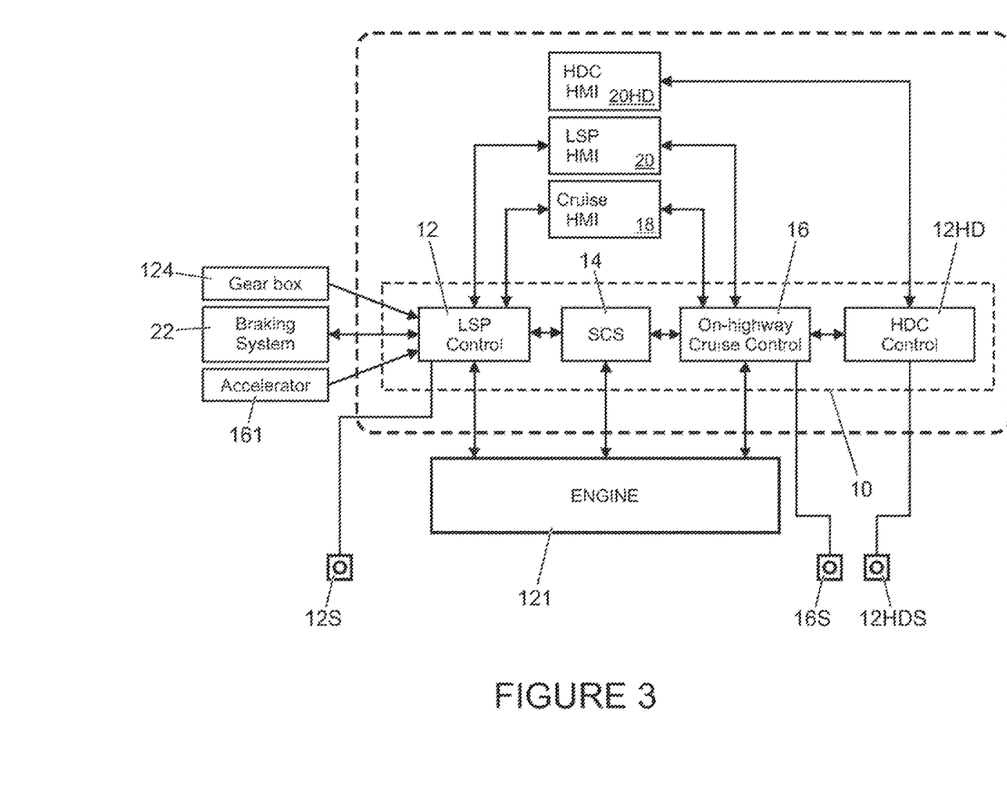
FIG. 3 is a high level schematic diagram of a system according to an embodiment of the invention, including a cruise control system and a low-speed progress control system.

A control system for the vehicle engine 121 includes a central controller 10, referred to as a vehicle control unit (VCU) 10, a powertrain controller 11, a brake controller 13 and a steering controller 170C. The brake controller 13 forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3 and a stability control system (SCS) 14. The SCS 14 improves the safety of the vehicle 100 by detecting and managing loss of traction. When a reduction in traction or steering control is detected, the SCS 14 is operable automatically to command a brake controller 13 to apply one or more brakes of the vehicle to help to steer the vehicle 100 in the direction the user wishes to travel. In the embodiment shown the SCS 14 is implemented by the VCU 10. In some alternative embodiments the SCS 14 may be implemented by the brake controller 13. Further alternatively, the SCS 14 may be implemented by a separate controller.

Although not shown in detail in FIG. 3, the VCU 10 further includes a Dynamic Stability Control (DSC) function block, a Traction Control (TC) function block, an Anti-Lock Braking System (ABS) function block and a Hill Descent Control (HDC) function block. These function blocks are implemented in software code run by a computing device of the VCU 10 and provide outputs indicative of, for example, DSC activity, TC activity, ABS activity, brake interventions on individual wheels and engine torque requests from the VCU 10 to the engine 121 in the event a wheel slip event occurs. Each of the aforementioned events indicate that a wheel slip event has occurred. Other vehicle sub-systems such as a roll stability control system or the like may also be useful.

Figure 5:
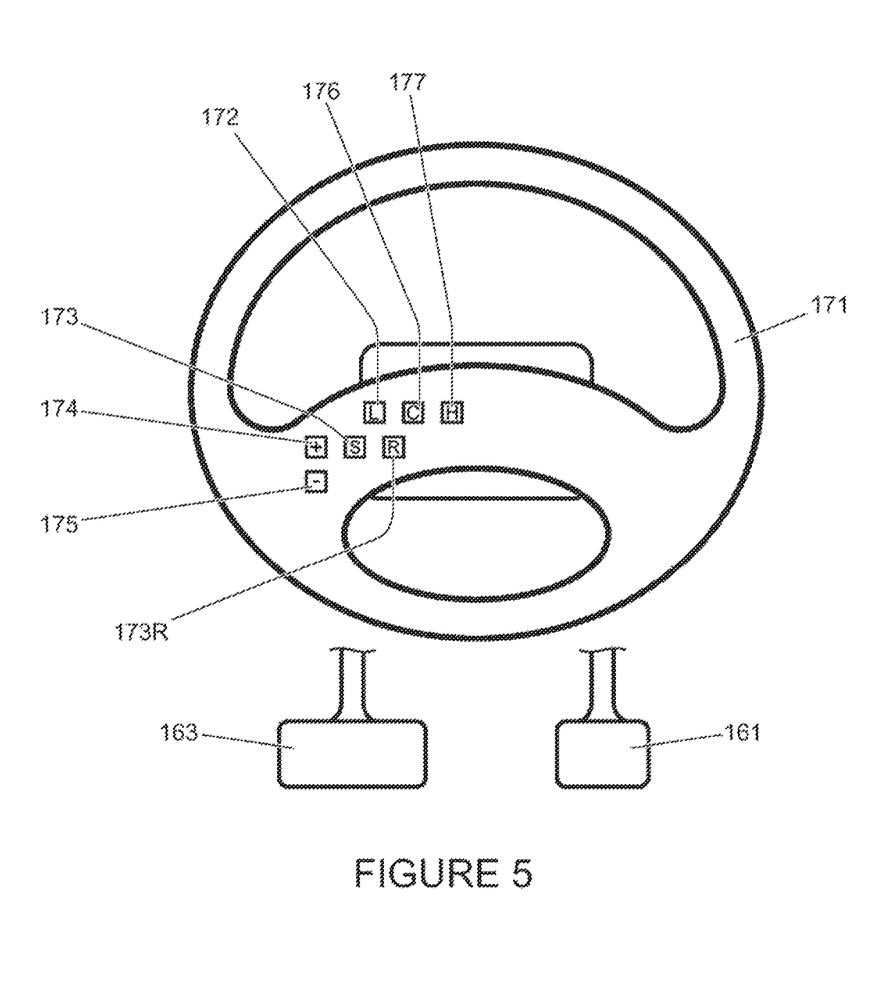
FIG. 5 illustrates a steering wheel and brake and accelerator pedals of a vehicle according to an embodiment of the present invention.

As noted above the vehicle 100 also includes a cruise control system 16 which is operable to automatically maintain vehicle speed at a selected speed when the vehicle is travelling at speeds in excess 25 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 5). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following driver over-ride. It is to be understood that known on-highway cruise control systems including the present system 16 are configured so that, in the event that the user depresses the brake or, in the case of vehicles with a manual transmission, a clutch pedal, the cruise control function is cancelled and the vehicle 100 reverts to a manual mode of operation which requires accelerator pedal input by a user in order to maintain vehicle speed. In addition, detection of a wheel slip event, as may be initiated by a loss of traction, also has the effect of cancelling the cruise control function. Speed control by the system 16 is resumed if the driver subsequently depresses the resume button 173R.

The cruise control system 16 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 18 may also be configured to provide an alert to the user about the status of the cruise control system 16 via a visual display of the HMI 18. In the present embodiment the cruise control system 16 is configured to allow the value of cruise_set-speed to be set to any value in the range 25-150 kph.

The LSP control system 12 also provides a speed-based control system for the user which enables the user to select a very low target speed at which the vehicle can progress without any pedal inputs being required by the user. Low-speed speed control (or progress control) functionality is not provided by the on-highway cruise control system 16 which operates only at speeds above 25 kph.

The LSP control system 12 is activated by means of a LSP control system selector button 172 mounted on the steering wheel 171. The system 12 is operable to apply selective powertrain, traction control and braking actions to one or more wheels of the vehicle 100, collectively or individually, to maintain the vehicle 100 at the desired speed.

The LSP control system 12 is configured to allow a user to input a desired value of set-speed parameter, LSP_set-speed to the LSP control system 12 via a low-speed progress control HMI (LSP HMI) 20 (FIG. 1, FIG. 3) which shares certain input buttons 173-175 with the cruise control system 16 and HDC control system 12HD. Provided the vehicle speed is within the allowable range of operation of the LSP control system (which is the range from 2 to 30 kph in the present embodiment although other ranges are also useful) the LSP control system 12 controls vehicle speed in accordance with the value of LSP_set-speed. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behaviour when slip is detected.

The LSP control HMI 20 is provided in the vehicle cabin so as to be readily accessible to the user. The user of the vehicle 100 is able to input to the LSP control system 12, via the LSP HMI 20, an indication of the speed at which the user desires the vehicle to travel (referred to as "the target speed") by means of the 'set-speed' button 173 and the '+'/'−' buttons 174, 175 in a similar manner to the cruise control system 16. The LSP HMI 20 also includes a visual display upon which information and guidance can be provided to the user about the status of the LSP control system 12.

The LSP control system 12 receives an input from the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161. An input is also provided to the LSP control system 12 from the transmission or gearbox 124. This input may include signals representative of, for example, the speed of an output shaft of the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20.

The HDC function block of the VCU 10 forms part of a HDC system 12HD. When the HDC system 12HD is active, the system 12HD controls the braking system 22 (of which the ABS function block forms part) in order to limit vehicle speed to a value corresponding to that of a HDC set-speed parameter HDC_set-speed which may be set by a user. The HDC set-speed may also be referred to as an HDC target speed. Provided the user does net override the HDC system by depressing the accelerator pedal when the HDC system is active, the HDC system 12HD controls the braking system 22 (FIG. 3) to prevent vehicle speed from exceeding the HDC_set-speed. In the present embodiment the HDC system 12HD is not operable to apply positive drive torque. Rather, the HDC system 12HD is only operable to apply negative brake torque.

A HDC system HMI 20HD is provided by means of which a user may control the HDC system 12HD, including setting the value of HDC_set-speed. An HDC system selector button 177 is provided on the steering wheel 171 by means of which a user may activate the HDC system 12HD to control vehicle speed.

As noted above, the HDC system 12HD is operable to allow a user to set a value of HDC set-speed parameter HDC_set-speed and to adjust the value of HDC_speed using the same controls as the cruise control system 18 and LSP control system 12. Thus, in the present embodiment, when the HDC system 12HD is controlling vehicle speed, the HDC system set-speed may be increased, decreased or set to an instant speed of the vehicle in a similar manner to the set-speed of the cruise control system 16 and LSP control system, using the same control buttons 173, 173R, 174, 175. The HDC system 12HD is operable to allow the value of HDC_speed to be set to any value in the range from 2-30 kph.

If the HDC system 12HD is selected when the vehicle 100 is travelling at a speed of 50 kph or less and no other speed control system is in operation, the HDC system 12HD sets the value of HDC_set-speed to a value selected from a look-up table. The value output by the look-up table is determined in dependence on the identity of the currently selected transmission gear, the currently selected PTU gear ratio (Hi/LO) and the currently selected driving mode. The HDC system 12HD then applies the powertrain 129 and/or braking system 22 to slow the vehicle 100 to the HDC system set-speed provided the driver does not override the HDC system 12HD by depressing the accelerator pedal 161. The HDC system 12HD is configured to slow the vehicle 100 to the set-speed value at a deceleration rate not exceeding a maximum allowable rate. The rate is set as 1.25 ms·2 in the present embodiment, however other values are also useful. If the user subsequently presses the 'set-speed' button 173 the HDC system 12HD sets the value of HDC-_set-speed to the instant vehicle speed provided the instant speed is 30 kph or less. If the HDC system 12HD is selected when the vehicle 100 is travelling at a speed exceeding 50 kph, the HDC system 12HD ignores the request and provides an indication to the user that the request has been ignored.

It is to be understood that the VCU 10 is configured to implement a known Terrain Response (TR)® System of the kind described above in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response modes, or control modes. In the embodiment of FIG. 1 four driving modes are provided: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain; a 'grass, gravel or snow' driving mode suitable for driving over grass, gravel or snow, a 'rock crawl' driving-mode suitable for driving slowly over a rocky surface; and a 'mud and ruts' driving mode suitable for driving in muddy, rutted terrain. Other driving modes may be provided in addition or instead.

In some embodiments, the LSP control system 12 may be in either one of an active condition, a standby condition and an 'off' condition. In the active condition, the LSP control system 12 actively manages vehicle speed by controlling powertrain torque and braking system torque. In the standby condition, the LSP control system 12 does not control vehicle speed until a user presses the resume button 173R or the 'set speed' button 173. In the off condition the LSP control system 12 is not responsive to input controls unless the LSP control system selector button 172 is depressed.

In the present embodiment the LSP control system 12 is also operable to assume an intermediate condition similar to that of the active mode but in which the LSP control system 12 is prevented from commanding the application of positive drive torque to one or more wheels of the vehicle 100 by the powertrain 129. Thus, only braking torque may be applied, by means of the braking system 22 and/or powertrain 129. Other arrangements are also useful.

With the LSP control system 12 in the active condition, the user may increase or decrease the vehicle set-speed by means of the '+' and '−' buttons 174, 175. In addition, the user may also increase or decrease the vehicle set-speed by lightly pressing the accelerator or brake pedals 161, 163 respectively. In some embodiments, with the LSP control system 12 in the active condition the '+' and '−' buttons 174, 175 are disabled such that adjustment of the value of LSP_set-speed can only be made by means of the accelerator and brake pedals 161, 163. This latter feature may prevent unintentional changes in set-speed from occurring, for example due to accidental pressing of one of the '+' or '−' buttons 174, 175. Accidental pressing may occur for example when negotiating difficult terrain where relatively large and frequent changes in steering angle may be required. Other arrangements are also useful.

It is to be understood that in the present embodiment the LSP control system 12 is operable to cause the vehicle to travel in accordance with a value of set-speed in the range from 2-30 kph whilst the cruise control system is operable to cause the vehicle to travel in accordance with a value of set-speed in the range from 25-150 kph although other values are also useful. If the LSP control system 12 is selected when the vehicle speed is above 30 kph but less than or substantially equal to 50 kph, the LSP control system 12 assumes the intermediate mode. In the intermediate mode, if the driver releases the accelerator pedal 161 whilst travelling above 30 kph the LSP control system 12 deploys the braking system 22 to slow the vehicle 100 to a value of set-speed corresponding to the value of parameter LSP_set-speed. Once the vehicle speed falls to 30 kph or below, the LSP control system 12 assumes the active condition in which if is operable to apply positive drive torque via the powertrain 129, as well as brake torque via the powertrain 129 (via engine braking) and the braking system 22 in order to control the vehicle in accordance with the LSP_set-speed value. If no LSP set-speed value has been set, the LSP control system 12 assumes the standby mode.

It is to be understood that if the LSP control system 12 is in the active mode, operation of the cruise control system 16 is inhibited. The two systems 12, 16 therefore operate independently of one another, so that only one can be operable at any one time, depending on the speed at which the vehicle is travelling.

In some embodiments, the cruise control HMI 18 and the LSP control HMI 20 may be configured within the same hardware so that, for example, the speed selection is input via the same hardware, with one or more separate switches being provided to switch between the LSP input and the cruise control input.

Figure 4:
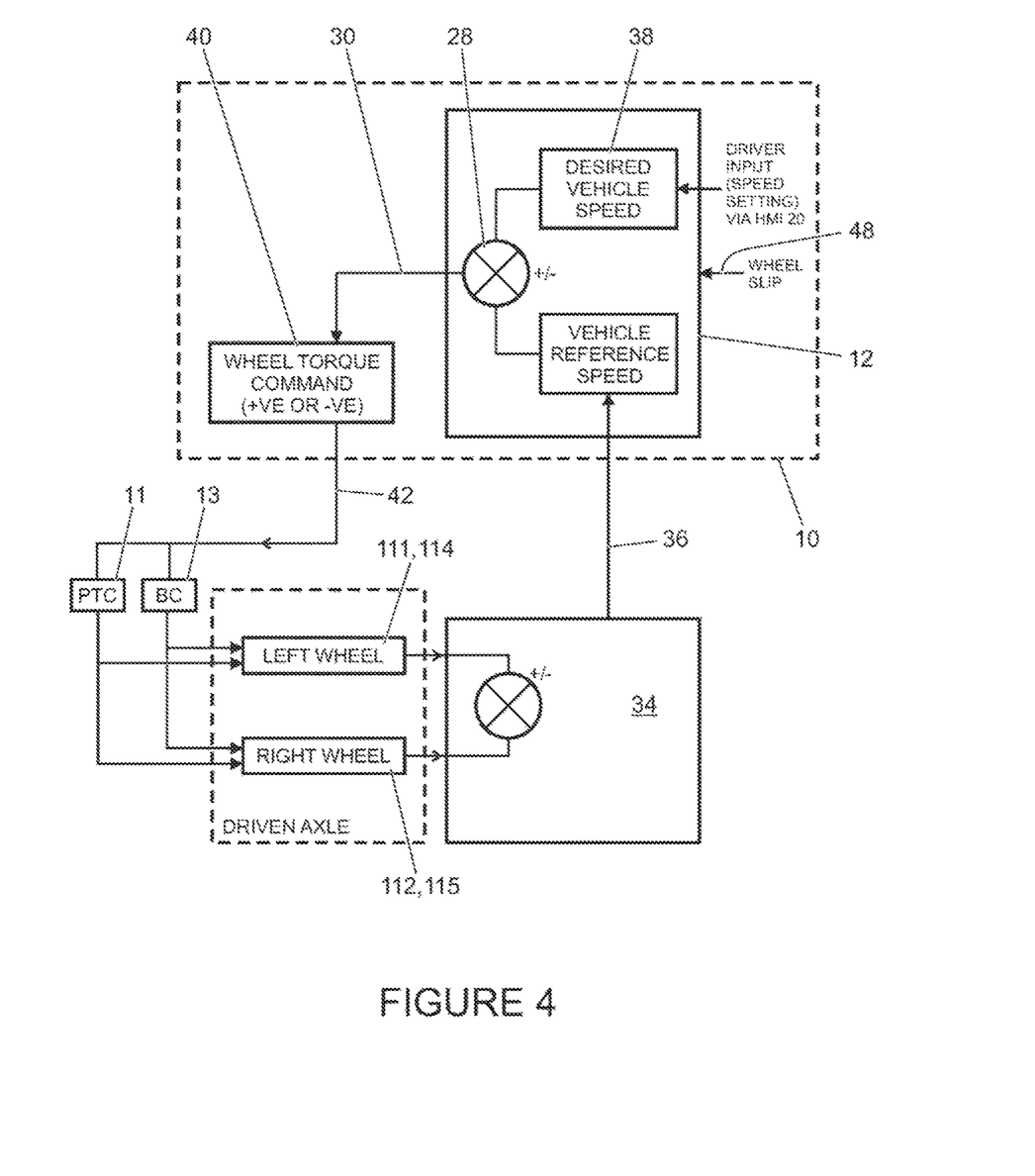
FIG. 4 is a schematic diagram of further features of the system in FIG. 3.

FIG. 4 illustrates the means by which vehicle speed is controlled in the LSP control system 12. As described above, a speed selected by a user (set-speed) is input to the LSP control system 12 via the LSP control HMI 20. A vehicle speed sensor 34 associated with the powertrain 129 (shown in FIG. 1) provides a signal 36 indicative of vehicle speed to the LSP control system 12. The LSP control system 12 includes a comparator 28 which compares the set-speed 38 (also referred to as a 'target speed' 38) selected by the user with the measured speed 36 and provides an output signal 30 indicative of the comparison. The output signal 30 is provided to an evaluator unit 40 of the VCU 10 which interprets the output signal 30 as either a demand for additional torque to be applied to the vehicle wheels 111-115, or for a reduction in torque applied to the vehicle wheels 111-115, depending on whether the vehicle speed needs to be increased or decreased to maintain the speed LSP_set-speed. An increase in torque is generally accomplished by increasing the amount of powertrain torque delivered to a given position of the powertrain, for example an engine output shaft, a wheel or any other suitable location. A decrease in torque at a given wheel to a value that is less positive or more negative may be accomplished by decreasing powertrain torque delivered to a wheel and/or by increasing a braking force on a wheel. It is to be understood that in some embodiments in which a powertrain 129 has one or more electric machines operable as a generator, negative torque may be applied by the powertrain 129 to one or more wheels by the electric machine. Negative torque may also be applied by means of engine braking in some circumstances, depending at least in part on the speed at which the vehicle 100 is moving. If one or more electric machines are provided that are operable as propulsion motors, positive drive torque may be applied by means of the one or more electric machines.

An output 42 from the evaluator unit 40 is provided to the powertrain controller 11 and brake controller 13 which in turn control a net torque applied to the vehicle wheels 111-115. The net torque may be increased or decreased depending on whether the evaluator unit 40 demands positive or negative torque. In order to cause application of the necessary positive or negative torque to the wheels, the evaluator unit 40 may command that positive or negative torque is applied to the vehicle wheels by the powertrain 129 and/or that a braking force is applied to the vehicle wheels by the braking system 22, either or both of which may be used to implement the change in torque that is necessary to attain and maintain a required vehicle speed. In the illustrated embodiment the torque is applied to the vehicle wheels individually so as to maintain the vehicle at the required speed, but in another embodiment torque may be applied to the wheels collectively to maintain the required speed. In some embodiments, the powertrain controller 11 may be operable to control an amount of torque applied to one or more wheels by controlling a driveline component such as a rear drive unit, front drive unit, differential or any other suitable component. For example, one or more components of the driveline 130 may include one or more clutches operable to allow an amount of torque applied to one or more wheels to be varied. Other arrangements are also useful.

Where a powertrain 129 includes one or more electric machines, for example one or more propulsion motors and/or generators, the powertrain controller 11 may be operable to modulate torque applied to one or more wheels by means of one or more electric machines.

The LSP control system 12 also receives a signal 48 indicative of a wheel slip event having occurred. This may be the same signal 48 that is supplied to the on-highway cruise control system 16 of the vehicle, and which in the case of the latter triggers an override or inhibit mode of operation in the on-highway cruise control system 18 so that automatic control of vehicle speed by the on-highway cruise control system 16 is suspended or cancelled. However, the LSP control system 12 is not arranged to cancel or suspend operation in dependence on receipt of a wheel slip signal 48 indicative of wheel slip. Rather, the system 12 is arranged to monitor and subsequently manage wheel slip so as to reduce driver workload. During a slip event, the LSP control system 12 continues to compare the measured vehicle speed with the value of LSP_set-speed, and continues to control automatically the torque applied to the vehicle wheels so as to maintain vehicle speed at the selected value. It is to be understood therefore that the LSP control system 12 is configured differently to the cruise control system 16, for which a wheel slip event has the effect of overriding the cruise control function so that manual operation of the vehicle must be resumed, or speed control by the cruise control system 12 resumed by pressing the resume button 173R or set-speed button 173.

In a further embodiment of the present invention (not shown) a wheel slip signal 48 is derived not just from a comparison of wheel speeds, but further refined using sensor data indicative of the vehicle's speed over ground. Such a speed over ground determination may be made via global positioning (GPS) data, or via a vehicle mounted radar or laser based system arranged to determine the relative movement of the vehicle 100 and the ground over which it is travelling. A camera system may be employed for determining speed over ground in some embodiments.

At any stage of the LSP control process the user can override the function by depressing the accelerator pedal 161 and/or brake pedal 163 to adjust the vehicle speed in a positive or negative sense. However, in the event that a wheel slip event is detected via signal 48, the LSP control system 12 remains active and control of vehicle speed by the LSP control system 12 is not suspended. As shown in FIG. 4, this may be implemented by providing a wheel slip event signal 48 to the LSP control system 12 which is then managed by the LSP control system 12. In the embodiment shown in FIG. 1 the SCS 14 generates the wheel slip event signal 48 and supplies it to the LSP control system 12 and cruise control system 16.

A wheel slip event is triggered when a loss of traction occurs at any one of the vehicle wheels. Wheels and tyres may be more prone to losing traction when travelling for example on snow, ice, mud or sand and/or on steep gradients or cross-slopes. A vehicle 100 may also be more prone to losing traction in environments where the terrain is more uneven or slippery compared with driving on a highway in normal on-road conditions. Embodiments of the present invention therefore find particular benefit when the vehicle 100 is being driven in an off-road environment, or in conditions in which wheel slip may commonly occur. Manual operation by the user in such conditions can be a difficult and often stressful experience and may result in an uncomfortable ride.

The vehicle 100 is also provided with additional sensors (not shown) which are representative of a variety of different parameters associated with vehicle motion and status. These may be inertial systems unique to the LSP or HDC control system 12, 12HD or part of an occupant restraint system or any other sub-system which may provide data from sensors such as gyros and/or accelerometers that may be indicative of vehicle body movement and may provide a useful input to the LSP and/or HDC control systems 12, 12HD. The signals from the sensors provide, or are used to calculate, a plurality of driving condition indicators (also referred to as terrain indicators) which are indicative of the nature of the terrain conditions over which the vehicle is travelling.

The sensors (not shown) on the vehicle 100 include, but are not limited to, sensors which provide continuous sensor outputs to the VCU 10, including wheel speed sensors, as mentioned previously and as shown in FIG. 5, an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14, a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used.

The VCU 10 also receives a signal from the steering controller 170C. The steering controller 170C is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C.

The VCU 10 evaluates the various sensor inputs to determine the probability that each of a plurality of different control modes (driving modes) for the vehicle subsystems is appropriate, with each control mode corresponding to a particular terrain type over which the vehicle is travelling (for example, mud and ruts, sand, grass/gravel/snow).

If the user has selected operation of the vehicle in an automatic driving mode selection condition, the VCU 10 then selects the most appropriate one of the control modes and is configured automatically to control the subsystems according to the selected mode. This aspect of the invention is described in further detail in our co-pending patent nos. GB2492748 and GB2492655, the contents of each of which is incorporated herein by reference.

The nature of the terrain over which the vehicle is travelling (as determined by reference to the selected control mode) may also be utilised in the LSP control system 12 to determine an appropriate increase or decrease in drive torque that is to be applied to the vehicle wheels. For example, if the user selects a value of LSP_set-speed that is not suitable for the nature of the terrain over which the vehicle is travelling, the system 12 is operable to automatically adjust the vehicle speed downwards by reducing the speed of the vehicle wheels. In some cases, for example, the user selected speed may not be achievable or appropriate over certain terrain types, particularly in the case of uneven or rough surfaces. If the system 12 selects a set-speed that differs from the user-selected set-speed, a visual indication of the speed constraint is provided to the user via the LSP HMI 20 to indicate that an alternative speed has been adopted.

The VCU 10 is operable to receive a signal indicative of a pitch rate of the vehicle, being a rate at which a pitch attitude of the vehicle is changing as a function of time. In some embodiments the pitch rate corresponds to a rate of rotation of the vehicle about a lateral (or 'east-west') axis through a vehicle reference position, such as a centre of mass of the vehicle.

The VCU 10 monitors the pitch rate periodically. If the VCU 10 determines that a leading portion of the vehicle 100 is pitching in a downward direction at a rate exceeding a prescribed value, the VCU 10 is configured to command application of brake torque to the wheels 111, 112, 114, 115. In the present embodiment, brake torque is applied to each of the four wheels. In some alternative embodiments brake torque may be applied to trailing wheels only of the vehicle so as to reduce a risk of excessive slip of the leading wheels. In some embodiments, brake torque is applied to each of the four wheels, but an amount of brake torque applied to trailing wheels of the vehicle is arranged to be greater than that applied to the leading wheels. This feature may be useful in reducing excessive slip of the leading wheels whilst still allowing some braking effect to be enjoyed from the leading wheels.

In some embodiments, the VCU 10 may be configured to determine whether the rate of pitch is due to only one or due to both leading wheels 111, 112 entering a depression such as a pot-hole. The VCU 10 may be operable to reduce, optionally to substantially zero, an amount of brake torque applied to a leading wheel that has entered a pot-hole relative to a leading wheel that has not entered a pot-hole. Other arrangements are also useful. In some embodiments, the VCU 10 may be operable to determine whether one or both of the leading wheels of the vehicle 100 have encountered an obstacle by monitoring forces on the leading wheels that are detected by the steering controller 170C. Other indicators may also be employed in addition or instead, such as data in respect of wheel articulation, lateral and longitudinal vehicle acceleration, vehicle body roll rate and vehicle yaw rate. It is to be understood that in some embodiments one or more of these phenomena may be employed to monitor the effect of the obstacle on vehicle progress.

The prescribed rate of pitch that triggers application of brake torque is determined by the VCU 10 according to the currently selected driving mode. As described above, the driving mode may be selected by the user by means of selector 141S, or automatically by the VCU 10. In some embodiments, the prescribed rate of pitch triggering application of brake torque may be determined in further dependence on whether a speed control system such as the LSP control system 12 or HDC control system 12HD is in operation.

Figure 6:
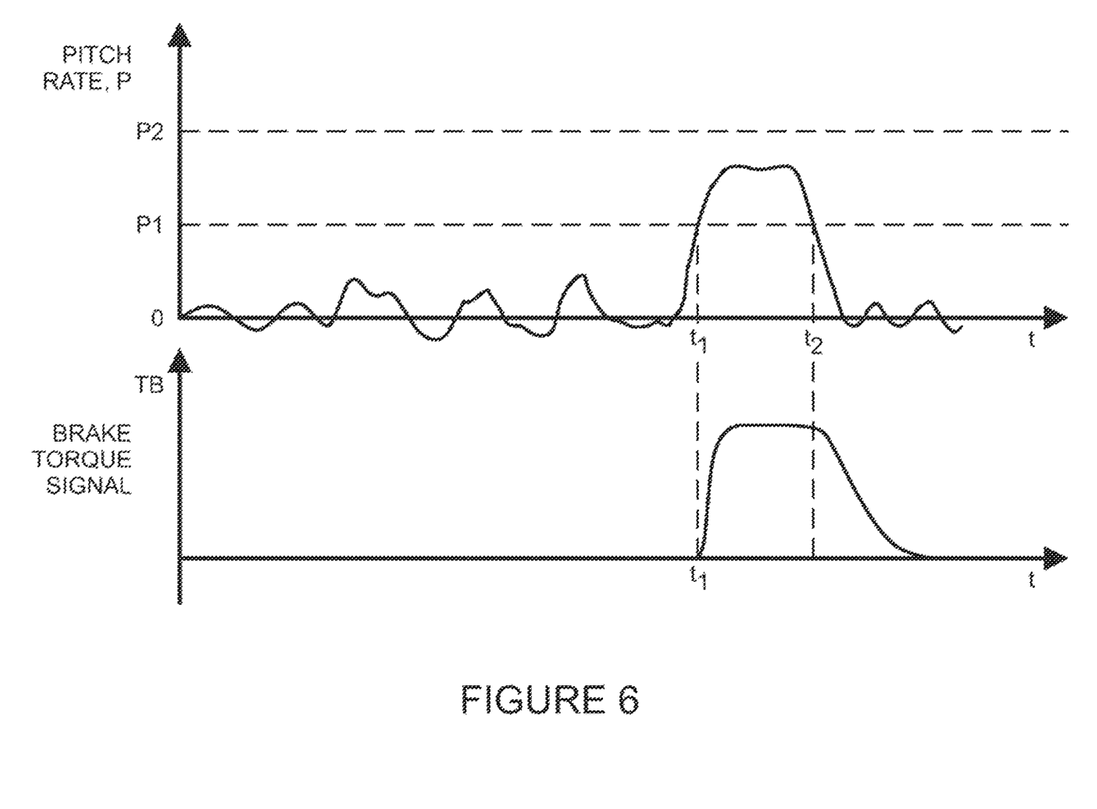

FIG. 6 is a plot of pitch rate P detected by the VCU 10 as a function of time t, together with a corresponding plot of brake torque TB commanded by the VCU 10 in response to detected pitch rate values. Two pitch rate thresholds P1 and P2 for pitch in a pitch-down direction are superimposed on the plot of pitch rate over time. Pitch rate P1 corresponds to the threshold above which braking is triggered when driving in the 'sand' driving mode whilst pitch rate P2 corresponds to the threshold above which braking is triggered when driving in the 'mud and ruts' driving mode. In some alternative embodiments pitch rate P1 may correspond to the 'mud and ruts' driving mode whilst pitch rate P2 may correspond to the 'sand' driving mode. Other arrangements are also useful it is to be understood that for driving over relatively slippery terrain with a relatively low surface coefficient of friction the pitch rate threshold may be set at a lower value than when driving over terrain with a relatively high surface coefficient of friction. However, surface roughness may also be taken into account, since an amount of allowable suspension articulation on a relatively rough surface (such as may be experienced in terrain corresponding to the 'mud and ruts' mode or 'rock crawl' mode may be lower than in the case of relatively smooth terrain.

In the example illustrated the vehicle 100 is driving in the 'sand' driving mode. Accordingly, if the VCU 10 determines that the pitch rate P has exceeded threshold value P1, the VCU 10 commands application of brake torque TB by means of braking system 22 in order to control or manage acceleration of the vehicle. The VCU 10 is configured to command an increase in brake torque by commanding an increase in brake pressure.

It can be seen from FIG. 6 that at time t1 the pitch rate in the pitch-down direction increases above the threshold value P1. Accordingly, the VCU 10 commands an increase in brake torque TB applied by the braking system 22. The brake torque TB increases in a relatively abrupt manner in order to reduce the amount by which the vehicle accelerates as a consequence of the abrupt change in pitch rate.

At time t2 the pitch rate falls below threshold value P1. In the present embodiment, at this time the VCU 10 begins to decrease applied brake torque in a gradual manner so as to permit time for a driver of the vehicle to initiate braking action by means of the brake pedal 163 and/or a reduction in demanded powertrain torque, for example by releasing accelerator pedal 161. In some embodiments, the VCU 10 may be configured to command brake torque TB in response to the increase in pitch rate for a prescribed period following the reduction in pitch rate below P1. Other arrangements are also useful.

For example, in some embodiments, when the VCU 10 has commanded the application of brake torque TB in response to pitch rate exceeding a prescribed value in a downward direction, the VCU 10 monitors vehicle pitch in order to detect when the vehicle 100 has started to change pitch attitude in an upward direction. When the VCU 10 detects that the vehicle 100 has begun to pitch upwardly, the VCU 10 may command a reduction in the amount of additional brake torque commanded by the VCU 10 due to the detection of pitching in a downward direction, optionally to substantially zero. Thus, if is to be understood that the VCU 10 may be configured to detect when one or more leading wheels of the vehicle 100 have reached the bottom of a depression or other downward gradient in a driving surface and to release the brake torque so as to allow the vehicle 100 to continue to make progress.

In some embodiments, the VCU 10 is operable also to command a change in stiffness of a suspension system of the vehicle by issuing a command to a suspension system controller. In the event that the rate of change of pitch attitude in a downward direction exceeds the prevailing threshold value P1 or P2 corresponding to the instant driving-mode, the VCU 10 commands the increase in brake torque TB and in addition the change in suspension stiffness. In some embodiments the VCU 10 is configured to command an increase in stiffness of the suspension system. In some alternative embodiments the VCU 10 is configured to command a decrease in suspension stillness. Other arrangements are also useful. In some embodiments the suspension system controller may vary a damper rate of one or more wheels in addition or instead. In some embodiments the suspension system controller may vary a ride height in addition or instead.

The VCU 10 may be operable to monitor pitch rate and command application of brake torque TB (and in some embodiments a change in one or more settings of the suspension system) when the vehicle is being driven with a speed control system active and when it is being driven with the speed control system not active. Thus, the VCU 10 may be operable to command application of brake torque in dependence on pitch rate regardless of whether the HDC system 12HD, LSP control system 12 or cruise control system 16 are selected for speed control. Other arrangements are also useful in some embodiments the VCU 10 may be arranged to command application of brake torque in dependence on pitch rate only when the HDC system 12HD is active.

In some embodiments the VCU 10 may be operable to command application of brake torque in dependence on pitch rate when the vehicle 100 is moving in a forward direction or when moving backwards. If the vehicle is moving backwards, the VCU 10 may be operable to command the increase in brake torque if a rear portion of the vehicle 100 pitches downwardly at a rate exceeding a prescribed pitch rate P. The prescribed pitch rate P in a given driving mode may be less than the corresponding rate in the same mode for travel in a forward direction. Alternatively the prescribed pitch rate may be greater than the corresponding value for forward travel, or substantially the same as that for forward travel.

In some embodiments a variable pitch rate threshold Pn may be employed, the value of Pn being set in dependence on a determination whether the vehicle is towing, and in dependence on a weight of a payload of the vehicle. It is to be understood that a lower pitch rate threshold may be employed if it is determined that the vehicle is towing in order to enhance composure of the vehicle and towed load. Similarly, the pitch rate threshold may be reduced as vehicle payload weight increases. Thus vehicle composure when travelling off road with a relatively heavy payload may be increased. A risk of damage to the vehicle due to negotiation of a pot-hole of other extreme variation in driving surface topography when heavily laden may thereby be reduced in some embodiments.

Some embodiments of the present invention provide a control system arranged to receive an input signal corresponding to a rate of change of an angle of pitch of the vehicle (pitch rate). If the pitch rate indicates that a leading end of the vehicle is pitching downwards, the system is operable to command a change in an amount of torque applied to one or more wheels of the vehicle in dependence on the pitch rate. In some embodiments, if the pitch rate exceeds a prescribed value, the system is operable to apply a brake to one or more wheels. Some embodiments of the invention have the advantage that if one or more leading wheels of the vehicle encounter a terrain feature at which the driving surface presents a relatively sudden or abrupt change in gradient in a downward direction, such as a pot-hole, a rot or the like, vehicle speed may be prevented from increasing excessively. In some embodiments, the control system may be configured to apply a braking system so as to cause deceleration of the vehicle. This feature has the advantage that a speed at which the vehicle negotiates the terrain feature may be reduced. Accordingly if a leading wheel of the vehicle reaches a lower region of the terrain feature and begins to climb out of the feature, an impulse experienced by the vehicle as the vehicle transitions from descent to climb may be reduced relative to that which would be experienced if brake torque were not applied automatically in response to pitch rate. Accordingly, vehicle composure and occupant comfort may be enhanced. Furthermore, a risk of damage to a vehicle due to grounding of the vehicle in which contact between an underside of the vehicle and ground takes place may be reduced.

Aspects and embodiments of the present invention may be understood by reference to the following numbered paragraphs:

1. A vehicle control system for a vehicle having a plurality of wheels, the vehicle speed control system being operable to receive an input signal corresponding to a rate of change of an angle of pitch of the vehicle (pitch rate), the system being operable to command a change in an amount of torque applied to at least one of the plurality of wheels in dependence on the pitch rate.

2. A control system according to paragraph 1 operable to command the change in the amount of torque when a leading edge of the vehicle pitches in a downward direction.

3. A control system according to paragraph 2 operable to command the change in an amount of torque applied to at least one of the plurality of wheels when a leading edge of the vehicle pitches in a downward direction at a pitch rate exceeding a prescribed rate.

4. A control system according to paragraph 3 operable to command the change in the amount of torque applied to at least one of the plurality of wheels when the leading edge of the vehicle pitches in a downward direction at a pitch rate exceeding a prescribed rate for a period exceeding a prescribed period.

5. A control system according to paragraph 3 operable to command the change in the amount of torque applied to at least one of the plurality of wheels when the leading edge of the vehicle pitches in a downward direction at a pitch rate exceeding a prescribed rate for a distance exceeding a prescribed distance.

6. A control system according to paragraph 1 operable to command the change in the amount of torque so as to oppose acceleration of the vehicle.

7. A control system according to paragraph 1 wherein the prescribed rate is determined in dependence on a type of terrain ever which the vehicle is travelling.

8. A control system according to paragraph 7 operable to determine the type of terrain over which the vehicle is travelling in dependence on one or more inputs indicative of terrain type.

9. A control system according to paragraph 7 operable to determine the type of terrain over which the vehicle is travelling in dependence on an input from a user in respect of terrain type.

10. A control system according to paragraph 7 operable to command the change in the amount of torque applied to at least one of the plurality of wheels when the leading edge of the vehicle pitches in a downward direction at a pitch rate exceeding a prescribed rate for a period exceeding a prescribed period, wherein the prescribed period is determined in dependence on the one or more inputs indicative of terrain type.

11. A control system according to paragraph 7 operable to command the change in the amount of torque applied to at least one of the plurality of wheels when the leading edge of the vehicle pitches in a downward direction at a pitch rate exceeding a prescribed rate for a distance exceeding a prescribed distance, wherein the prescribed distance is determined in dependence on the due or more inputs indicative of terrain type.

12. A control system according to paragraph 7 operable to control the vehicle to operate in one of a plurality of respective driving modes in each of which one or more vehicle subsystems are configured for operation on a different respective terrain type, wherein the driving mode is selected in dependence on the terrain type.

13. A control system according to paragraph 1 operable to command a change in one or more parameters associated with a vehicle suspension system in dependence at least in part on the pitch rate.

14. A control system according to paragraph 13 wherein the prescribed rate is determined in dependence on a type of terrain over which the vehicle is travelling, the system being operable to command the change in one or more parameters associated with the suspension system in dependence at least in part on the pitch rate and the terrain type.

15. A control system according to paragraph 13 wherein the one or more parameters include a stiffness of the suspension system.

16. A control system according to paragraph 1 operable automatically to cause the vehicle to operate in accordance with a target speed value.

17. A control system according to paragraph 16 operable to cause the vehicle to operate in accordance with the target speed value by controlling an amount of torque applied to one or more wheels of the vehicle.

18. A control system according to paragraph 16 operable to continue to cause the vehicle to operate in accordance with the target speed value in the presence of detected slip of one or more wheels.

19. A vehicle comprising a control system according to paragraph 1.

20. A method of controlling a vehicle by means of a control system comprising:
  receiving an input signal corresponding to a rate of change of an angle of pitch of the vehicle, pitch rate; and
  commanding a change in an amount of torque applied to at least one of a plurality of wheels of the vehicle in dependence on the pitch rate.

It will be understood that the embodiments described above are given by way of example only and are not intended to limit the invention, the scope of which is defined in the appended claims.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A system for a vehicle having a plurality of wheels, the system comprising:
  an input configured to receive an input signal corresponding to a rate of change of an angle of pitch of the vehicle (pitch rate); and
  a processor configured to command an application of brake torque to change an amount of torque applied to at least one of the plurality of wheels in dependence on the input signal corresponding to pitch rate received by the input, and wherein the processor is configured to command the change in an amount of torque applied to at least one of the plurality of wheels when a leading edge of the vehicle pitches in a downward direction at a pitch rate exceeding a prescribed rate, wherein the prescribed rate is determined in dependence on a type of terrain over which the vehicle is travelling.

2. A system according to claim 1, wherein the processor is configured to command the change in the amount of torque applied to at least one of the plurality of wheels when the leading edge of the vehicle pitches in a downward direction at a pitch rate exceeding a prescribed rate for a period exceeding a prescribed period.

3. A system according to claim 1, wherein the processor is configured to command the change in the amount of torque applied to at least one of the plurality of wheels when the leading edge of the vehicle pitches in a downward direction at a pitch rate exceeding a prescribed rate for a distance exceeding a prescribed distance.

4. A system according to claim 1, wherein the processor is configured to command the change in the amount of torque so as to oppose acceleration of the vehicle.

5. A system according to claim 1, wherein the processor is configured to determine the type of terrain over which the vehicle is travelling in dependence on one or more inputs indicative of terrain type.

6. A system according to claim 1, wherein the processor is configured to determine the type of terrain over which the vehicle is travelling in dependence on an input from a user in respect of terrain type.

7. A system according to claim 1, wherein the processor is configured to command the change in the amount of torque applied to at least one of the plurality of wheels when the leading edge of the vehicle pitches in a downward direction at a pitch rate exceeding a prescribed rate for a period exceeding a prescribed period, wherein the prescribed period is determined in dependence on one or more inputs indicative of terrain type.

8. A system according to claim 1, wherein the processor is configured to command the change in the amount of torque applied to at least one of the plurality of wheels when the leading edge of the vehicle pitches in a downward direction at a pitch rate exceeding a prescribed rate for a distance exceeding a prescribed distance, wherein the prescribed distance is determined in dependence on one or more inputs indicative of terrain type.

9. A system according to claim 1, wherein the processor is configured to control the vehicle to operate in one of a plurality of respective driving modes in each of which one or more vehicle subsystems are configured for operation on a different respective terrain type, wherein the driving mode is selected in dependence on the terrain type.

10. A system according to claim 1, wherein the processor is configured to command a change in one or more parameters associated with a vehicle suspension system in dependence at least in part on the pitch rate.

11. A system according to claim 10, wherein the processor is configured to command the change in one or more parameters associated with the suspension system in dependence at least in part on the pitch rate and the terrain type.

12. A system according to claim 10 wherein the one or more parameters include a stiffness of the suspension system.

13. A system according to claim 1, wherein the processor is configured automatically to cause the vehicle to operate in accordance with a target speed value.

14. A system according to claim 13, wherein the processor is configured to cause the vehicle to operate in accordance with the target speed value by controlling an amount of torque applied to one or more wheels of the vehicle.

15. A system according to claim 13, wherein the processor is configured to continue to cause the vehicle to operate in accordance with the target speed value in the presence of detected slip of one or more wheels.

16. A vehicle comprising a system according to claim 1.

17. A method of controlling a vehicle comprising:
receiving an input signal corresponding to a rate of change of an angle of pitch of the vehicle (pitch rate); and
commanding an application of brake torque to cause a change in an amount of torque applied to at least one of a plurality of wheels of the vehicle when a leading edge of the vehicle pitches in a downward direction at a pitch rate exceeding a prescribed rate, the prescribed rate being determined in dependence on a type of terrain over which the vehicle is travelling.

* * * * *